(12) United States Patent
Duprey et al.

(10) Patent No.: US 9,535,622 B1
(45) Date of Patent: Jan. 3, 2017

(54) SCALABLE DISTRIBUTED SLICE BROKER

(71) Applicant: EMC Corporation, Hopkinton, MA (US)

(72) Inventors: Dennis Duprey, Raleigh, NC (US); Miles A. de Forest, Bahama, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 188 days.

(21) Appl. No.: 14/137,457

(22) Filed: Dec. 20, 2013

(51) Int. Cl.
*G06F 12/00* (2006.01)
*G06F 3/06* (2006.01)

(52) U.S. Cl.
CPC .......... *G06F 3/0631* (2013.01); *G06F 3/0614* (2013.01); *G06F 3/0689* (2013.01)

(58) Field of Classification Search
USPC .......................................... 711/114, 156, 213
See application file for complete search history.

(56) References Cited

U.S. PATENT DOCUMENTS

| | | | | |
|---|---|---|---|---|
| 5,809,285 A * | 9/1998 | Hilland | | G06F 3/0608 703/25 |
| 8,966,194 B2 * | 2/2015 | Resch | | H04L 1/0045 711/154 |
| 9,122,697 B1 * | 9/2015 | Bono | | G06F 17/30091 |
| 9,286,007 B1 * | 3/2016 | Bono | | G06F 3/0689 |
| 2012/0030437 A1 * | 2/2012 | Resch | | H04L 1/0045 711/156 |
| 2013/0346366 A1 * | 12/2013 | Ananthanarayanan | | G06F 17/30578 707/611 |
| 2014/0164551 A1 * | 6/2014 | Resch | | G06F 11/1092 709/213 |
| 2014/0281223 A1 * | 9/2014 | Resch | | G06F 3/067 711/114 |

* cited by examiner

*Primary Examiner* — Mardochee Chery
(74) *Attorney, Agent, or Firm* — Brian J. Colandreo; Mark H. Whittenberger; Holland & Knight LLP

(57) ABSTRACT

A method, computer program product, and computing system for defining a master slice pool within a backend storage array of a storage system. The master slice pool includes a plurality of data storage slices. A first portion of the plurality of data storage slices is assigned to a first frontend system included within the storage system, thus defining a first frontend slice pool. One or more data storage slices included within the first frontend slice pool are allocated to one or more storage objects associated with the first frontend system. A quantity of unused data storage slices included within the first frontend slice pool is determined. The quantity of unused data storage slices is adjusted based upon a target slice level.

20 Claims, 3 Drawing Sheets

SCALABLE DISTRIBUTED SLICE BROKER

TECHNICAL FIELD

This disclosure relates to storage systems and, more particularly, to the allocation of storage within these storage systems.

BACKGROUND

Storing and safeguarding electronic content is of paramount importance in modern business. Accordingly, large storage systems may be utilized to protect such electronic content. Unfortunately, the allocation of the discrete quantities of storage included within these large storage systems may be complex and may require the frontend components of these storage systems to obtain, maintain and protect these discrete quantities of storage.

SUMMARY OF DISCLOSURE

In one implementation, a computer-implemented method includes defining a master slice pool within a backend storage array of a storage system. The master slice pool includes a plurality of data storage slices. A first portion of the plurality of data storage slices is assigned to a first frontend system included within the storage system, thus defining a first frontend slice pool. One or more data storage slices included within the first frontend slice pool are allocated to one or more storage objects associated with the first frontend system. A quantity of unused data storage slices included within the first frontend slice pool is determined. The quantity of unused data storage slices is adjusted based upon a target slice level.

One or more of the following features may be included. Adjusting the quantity of unused data storage slices based upon a target slice level may include one or more of: obtaining additional data storage slices from the master slice pool for the first frontend slice pool if the quantity of unused data storage slices is less than the target slice level; and returning surplus data storage slices from the first frontend slice pool to the master slice pool if the quantity of unused data storage slices is greater than the target slice level. Allocating one or more data storage slices included within the first frontend slice pool to one or more storage objects associated with the first frontend system may include one or more of: assigning a data storage slice included within the first frontend slice pool to a storage objects associated with the first frontend system; and unassigning a data storage slice included within the first frontend slice pool from a storage object associated with the first frontend system. The first frontend system may include a first pair of storage processors. A second portion of the plurality of discrete slices may be assigned to a second frontend system included within the storage system, wherein the second frontend system includes a second pair of storage processors. The plurality of data storage slices included within the master slice pool may be associated with one or more storage objects defined within the backend storage array. The master slice pool may be compartmentalized into a plurality of performance tiers and the first frontend slice pool may be compartmentalized into a plurality of performance tiers.

In another implementation, a computing system including a processor and memory is configured to perform operations including defining a master slice pool within a backend storage array of a storage system. The master slice pool includes a plurality of data storage slices. A first portion of the plurality of data storage slices is assigned to a first frontend system included within the storage system, thus defining a first frontend slice pool. One or more data storage slices included within the first frontend slice pool are allocated to one or more storage objects associated with the first frontend system. A quantity of unused data storage slices included within the first frontend slice pool is determined. The quantity of unused data storage slices is adjusted based upon a target slice level.

One or more of the following features may be included. Adjusting the quantity of unused data storage slices based upon a target slice level may include one or more of: obtaining additional data storage slices from the master slice pool for the first frontend slice pool if the quantity of unused data storage slices is less than the target slice level; and returning surplus data storage slices from the first frontend slice pool to the master slice pool if the quantity of unused data storage slices is greater than the target slice level. Allocating one or more data storage slices included within the first frontend slice pool to one or more storage objects associated with the first frontend system may include one or more of: assigning a data storage slice included within the In another implementation, a computer program product resides on a computer readable medium and has a plurality of instructions stored on it. When executed by a processor, the instructions cause the processor to perform operations including defining a master slice pool within a backend the first frontend system; and unassigning a data storage slice included within the first frontend slice pool from a storage object associated with the first frontend system. The first frontend system may include a first pair of storage processors. A second portion of the plurality of discrete slices may be assigned to a second frontend system included within the storage system, wherein the second frontend system includes a second pair of storage processors. The plurality of data storage slices included within the master slice pool may be associated with one or more storage objects defined within the backend storage array. The master slice pool may be compartmentalized into a plurality of performance tiers and the first frontend slice pool may be compartmentalized into a plurality of performance tiers.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
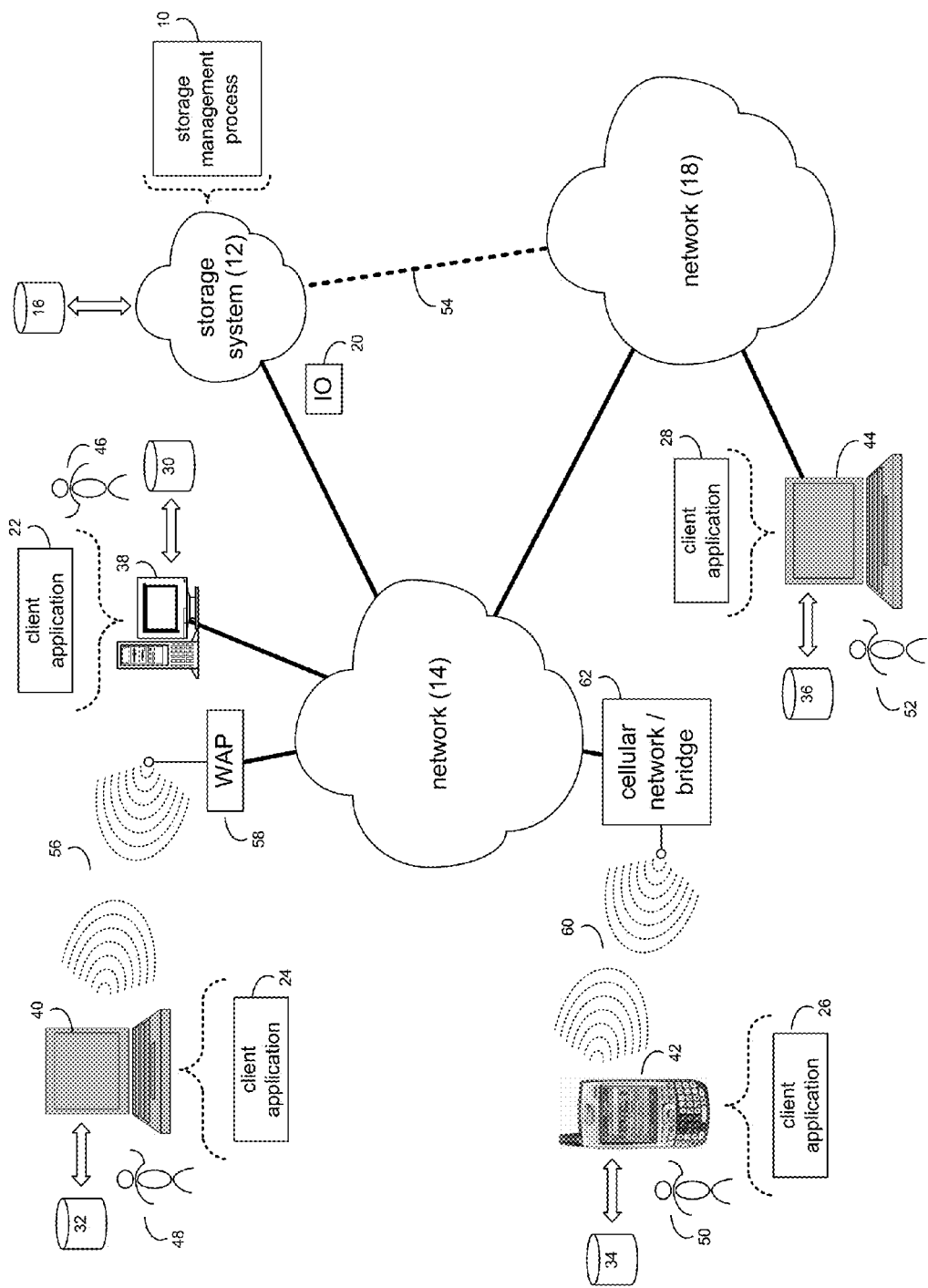
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
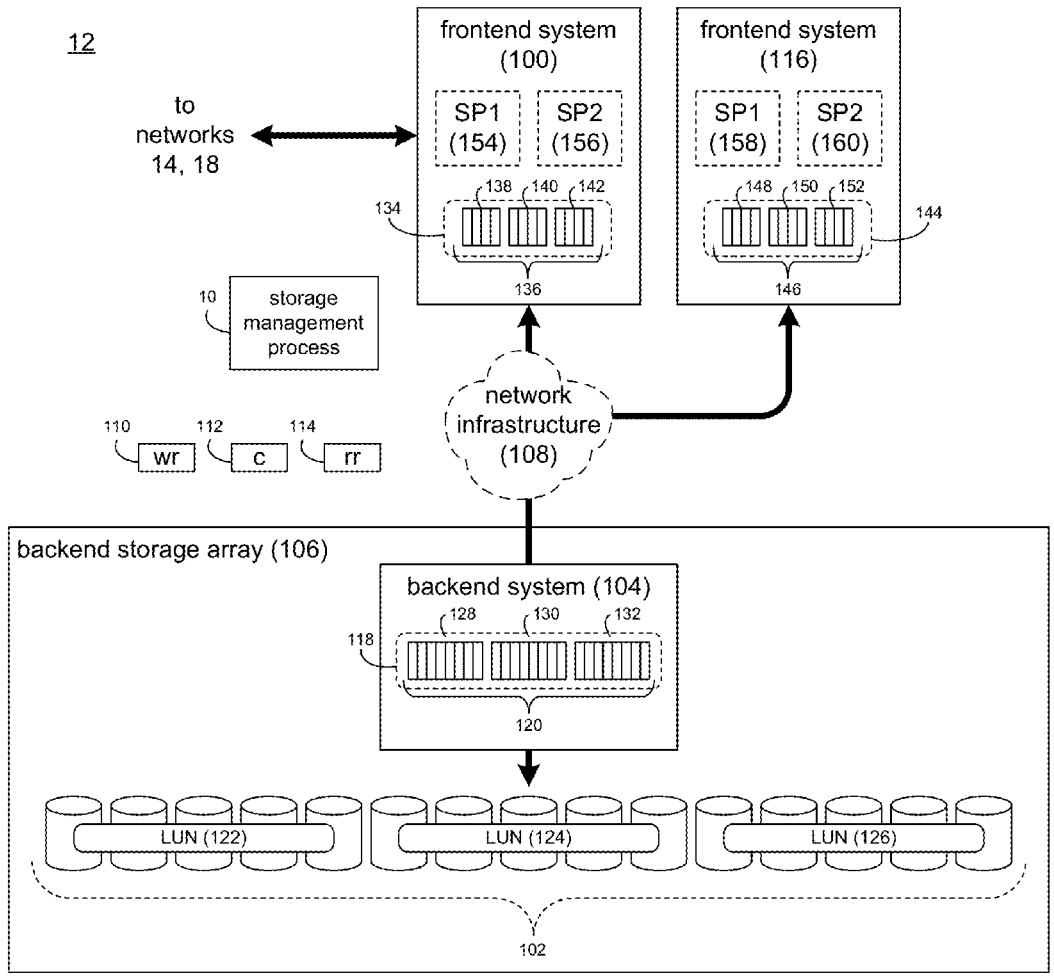
FIG. 2 is a diagrammatic view of the storage system of FIG. 1.

Referring also to FIG. 2, storage system 12 may include frontend system 100 and plurality of storage targets 102. The quantity of storage targets included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/Flash devices, wherein the combination of plurality of storage targets 102 and processing/control systems (e.g., backend system 104) may form backed storage array 106.

The manner in which storage system 12 is implemented may vary depending upon e.g. the level of redundancy/performance/capacity required. For example, storage system 12 may be a RAID device in which first frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which first frontend system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. first frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to first frontend system 100, may be executed by one or more processors (not shown) and one or more memory architectures (not shown) included within first frontend system 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when first frontend system 100 is configured as an application server, these IO requests may be internally generated within first frontend system 100. Examples of IO request 20 may include but are not limited to data write request 110 (i.e. a request that content 112 be written to storage system 12) and data read request 114 (i.e. a request that content 112 be read from storage system 12).

During operation of first frontend system 100, content 112 to be written to storage system 12 may be processed by first frontend system 100. Additionally/alternatively and when first frontend system 100 is configured as an application server, content 112 to be written to storage system 12 may be internally generated by first frontend system 100.

One or more additional frontend systems (e.g., second frontend system 116) may be coupled to backed storage array 106, wherein additional content (not shown) to be written to backed storage array 106 may be processed by second frontend system 116.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on first frontend system 100, some or all of the instruction sets and subroutines of storage management process 10 may be executed by one or more processors (not shown) and one or more memory architectures (not shown) included within backend system 104 of backed storage array 106.

Figure 3:
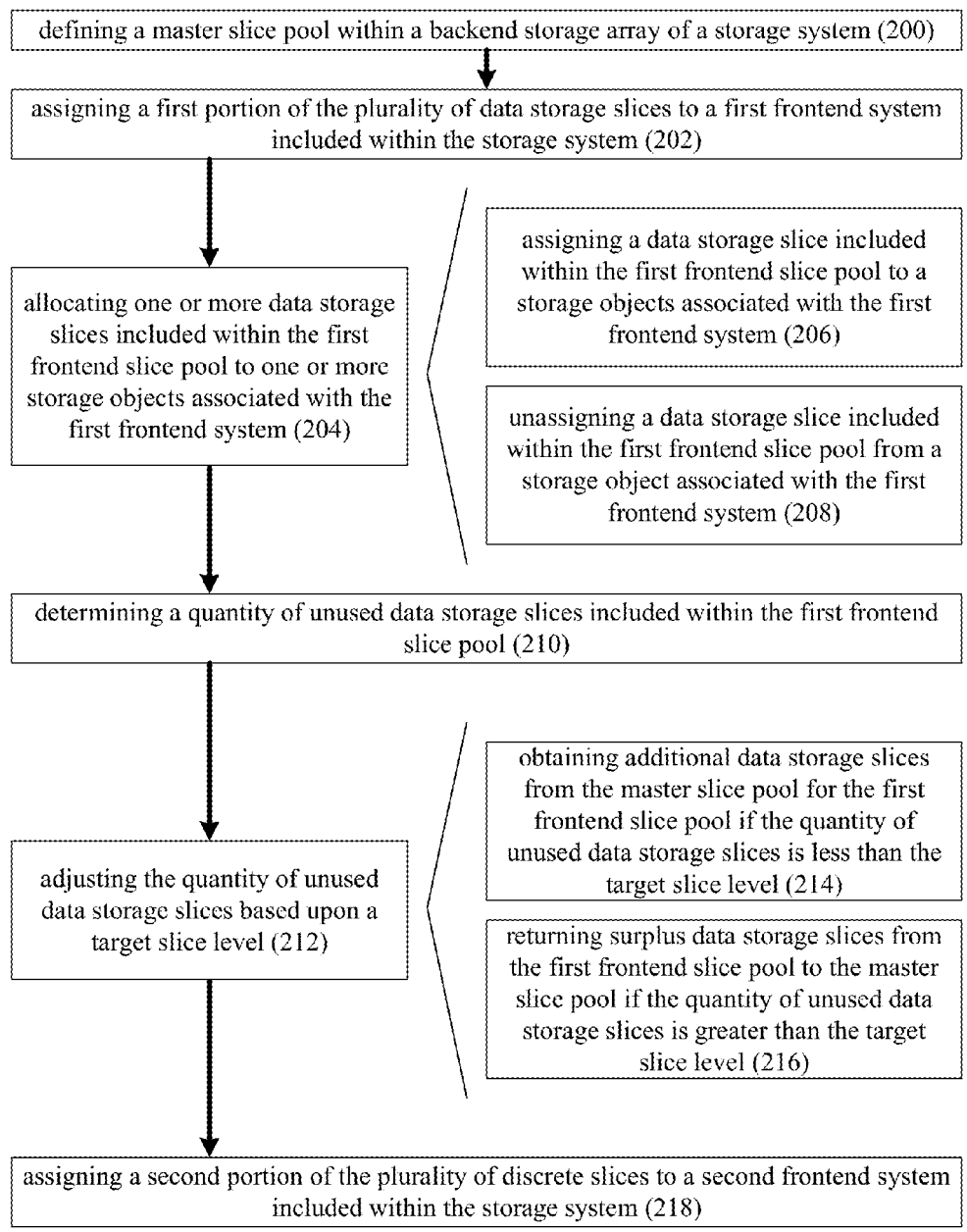
FIG. 3 is a flow chart of one implementation of the storage management process of FIG. 1.

The Storage Management Process:

Referring also to FIG. 3, storage management process 10 may define 200 a master slice pool (e.g., master slice pool 118) within backend storage array 106 of storage system 12, wherein master slice pool 118 includes a plurality of data storage slices (e.g., plurality of data storage slices 120). Plurality of data storage slices 120 included within master slice pool 118 may be associated with one or more LUNs (e.g., LUNs 122, 124, 126) defined within backend storage array 106. For example, a first portion (e.g., portion 128) of plurality of data storage slices 120 may be mapped to/a portion of LUN 122; a second portion (e.g., portion 130) of plurality of data storage slices 120 may be mapped to/a portion of LUN 124; and a third portion (e.g., portion 132) of plurality of data storage slices 120 may be mapped to/a portion of LUN 126.

While, in this particular explain, one master slice pool is shown (namely master slice pool 118), it is understood that the quantity of master slice pools may be increased depending upon need and design criteria (e.g., for an accounting storage pool, a legal storage pool, a development storage pool).

While data storage slices 120 included within master slice pool 118 are shown to be associated with one or more LUNs (e.g., LUNs 122, 124, 126), this is for illustrative purposes only and is not intended to be a limitation of this disclosure. Specifically, data storage slices 120 may be associated with any form of data storage object (e.g., LUNs, File Systems, Virtual disks).

As is known in the art, a LUN is a logical storage unit identifier that is mapped to and defines physical storage space within physical storage devices (e.g., one or more of plurality of storage targets 102). For example, LUN 122 may be mapped to and define a first group of storage targets within plurality of storage targets 102; LUN 124 may be mapped to and define a second group of storage targets within plurality of storage targets 102; and LUN 126 may be mapped to and define a third group of storage targets within plurality of storage targets 102.

Further, these various LUNs (e.g., LUNs 122, 124, 126) may be configured to provide different levels of performance. For example, the first group of storage targets within plurality of storage targets 102 may be flash-based storage targets that are configured to provide high-level performance & low-level capacity. Accordingly, LUN 122 may provide high-level performance & low-level capacity. Further, the second group of storage targets within plurality of storage targets 102 may be SAS-based storage targets that are configured to provide mid-level performance & mid-level capacity. Accordingly, LUN 124 may provide mid-level performance & mid-level capacity. Additionally, the third group of storage targets within plurality of storage targets 102 may be NL/SAS-based storage targets that are configured to provide low-level performance & high-level capacity. Accordingly, LUN 126 may provide low-level performance & high-level capacity.

Therefore, master slice pool 118 may be compartmentalized into a plurality of performance tiers, wherein portion 128 provides high-level performance (being mapped to Flash-based storage targets), portion 130 provides mid-level performance (being mapped to SAS-based storage targets), and portion 132 provides low-level performance (being mapped to NL/SAS-based storage targets). Alternatively, these performance tiers may be based upon other criteria, such as cost (e.g., $/GB) and protection differences (e.g. RAID 6 vs. RAID 5).

Storage management process 10 may assign 202 a first portion of plurality of data storage slices 120 to a first frontend system (e.g., first frontend system 100) included within storage system 12, thus defining a first frontend slice pool (e.g., first frontend slice pool 134). First frontend slice pool 134 includes plurality of data storage slices 136, wherein each data storage slice included within plurality of data storage slices 136 maps back to a data storage slice included within plurality of data storage slices 120.

Since master slice pool 118 may be compartmentalized into a plurality of performance tiers (e.g., high-level performance, mid-level performance, low-level performance), first frontend slice pool 134 may also be compartmentalized into a plurality of performance tiers, since plurality of data storage slices 136 included within first frontend slice pool 134 is a subset of plurality of data storage slices 120 included within master slice pool 118. For example, a first portion (e.g., portion 138) of plurality of data storage slices 136 may be a high-level performance portion and may be mapped to data storage slices included within portion 128 of plurality of data storage slices 120 (which are mapped to/a portion of LUN 122 that is configured for high-level performance). Further, a second portion (e.g., portion 140) of plurality of data storage slices 136 may be a mid-level performance portion and may be mapped to data storage slices included within portion 130 of plurality of data storage slices 120 (which are mapped to/a portion of LUN 124 that is configured for mid-level performance). Additionally, a third portion (e.g., portion 142) of plurality of data storage slices 136 may be a low-level performance portion and may be mapped to data storage slices included within portion 132 of plurality of data storage slices 120 (which are mapped to/a portion of LUN 126 that is configured for low-level performance).

Storage management process 10 may allocate 204 one or more of the data storage slices (e.g., plurality of data storage slices 136) included within first frontend slice pool 134 to one or more storage objects associated with first frontend system 100. For example, first frontend system 100 may be configured to provide storage to one or more users (e.g., one or more of user 46, 48, 50, 52) accessing storage system 12. Accordingly, as the storage needs of user 46, 48, 50, 52 change, the quantity of data storage slices available to these users may also change.

When allocating 204 one or more data storage slices (e.g., plurality of data storage slices 136) included within first frontend slice pool 134 to one or more storage objects associated with first frontend system 100, storage management process 10 may e.g., assign 206 a data storage slice included within first frontend slice pool 134 to a storage object (associated with first frontend system 100) and/or may e.g., unassign 208 a data storage slice included within first frontend slice pool 134 from a storage object associated with first frontend system 100.

For example, in the event that user 46 is no longer using first frontend system 100 (e.g., they left the company for whom they were employed), the data storage slices assigned to user 46 may be unassigned 208 by storage management process 10 and returned to/made available within first frontend slice pool 134. Conversely, if a new employee (not shown) was hired, the data storage slices within first frontend slice pool 134 may be assigned 206 to this new user. Additionally, if the storage needs of a user (e.g., one or more of user 46, 48, 50, 52) change, the quantity of data storage slices assigned to the user may be increased/decreased to accommodate those needs. Additionally and as is known in the art, applications may consume storage (requiring more data storage slices) and when an application is retired/replaced the data storage slices may be unassigned and returned to e.g., first frontend slice pool 134.

Storage management process 10 may determine 210 a quantity of unused data storage slices included within first frontend slice pool 134 and may adjust 212 the quantity of unused data storage slices based upon a target slice level. For example and as discussed above, included within first frontend slice pool 134 may be data storage slices that are available to be assigned to storage objects associated with first frontend system 100. Further and as discussed above, as data storage slices are unassigned from storage objects, these recently-unassigned data storage objects may be placed back into first frontend slice pool 134 for subsequent reassignment.

Accordingly, storage management process 10 may determine 210 that there are e.g., thirty unused data storage slices included within first frontend slice pool 134 and may adjust 212 the quantity of unused data storage slices based upon a target slice level. When adjusting 212 the quantity of unused data storage slices based upon the target slice level, storage management process 10 may obtain 214 additional data storage slices from master slice pool 118 for first frontend slice pool 134 if the quantity of unused data storage slices (e.g., thirty) is less than the target slice level (e.g., forty) and/or return 216 surplus data storage slices from first frontend slice pool 134 to master slice pool 118 if the quantity of unused data storage slices (e.g., thirty) is greater than the target slice level (e.g., twenty). Prior to returning a data storage slice to master slice pool 118 from first frontend slice pool 134, storage management process 10 may erase any and all data included within the data storage slice being returned.

As discussed above, first frontend slice pool 134 may be compartmentalized into a plurality of performance tiers (e.g., high-level performance portion 138, mid-level performance portion 140 and low-level performance portion 142). Accordingly and in such a situation, storage management process 10 may determine 210 a quantity of unused data storage slices included within each portion (e.g., portions 138, 140, 142) of first frontend slice pool 134 and may adjust 212 the quantity of unused data storage slices included within each portion (e.g., portions 138, 140, 142) based upon a target slice level for each portion. For example, the target slice level for portion 138 may be ten, the target slice level for portion 140 may be twenty, and the target slice level for portion 142 may be thirty.

As discussed above, one or more additional frontend systems (e.g., second frontend system 116) may be coupled to backed storage array 106, wherein additional content (not shown) to be written to backed storage array 106 may be processed by second frontend system 116. In such a situation, storage management process 10 may assign 218 a second portion of plurality of data storage slices 120 to second frontend system 116 included within storage system 12, thus defining a second frontend slice pool (e.g., second frontend slice pool 144). Second frontend slice pool 144 includes plurality of data storage slices 146, wherein each data storage slice included within plurality of data storage slices 146 maps back to a data storage slice included within plurality of data storage slices 120.

Since master slice pool 118 may be compartmentalized into a plurality of performance tiers (e.g., high-level performance, mid-level performance, low-level performance), second frontend slice pool 144 may also be compartmentalized into a plurality of performance tiers, since plurality of data storage slices 146 included within second frontend slice pool 144 is a subset of plurality of data storage slices 120 included within master slice pool 118. For example, a first portion (e.g., portion 148) of plurality of data storage slices 146 may be a high-level performance portion and may be mapped to data storage slices included within portion 128 of plurality of data storage slices 120 (which are mapped to/a portion of LUN 122 that is configured for high-level performance). Further, a second portion (e.g., portion 150) of plurality of data storage slices 146 may be a mid-level performance portion and may be mapped to data storage slices included within portion 130 of plurality of data storage slices 120 (which are mapped to/a portion of LUN 124 that is configured for mid-level performance). Additionally, a third portion (e.g., portion 152) of plurality of data storage slices 146 may be a low-level performance portion and may be mapped to data storage slices included within portion 132 of plurality of data storage slices 120 (which are mapped to/a portion of LUN 126 that is configured for low-level performance).

In the interest of high availability and redundancy, first frontend system 100 and second frontend system 116 may each include a pair of storage processors (e.g., storage processors 154/156 and storage processors 158/160 respectively). When configured in such a manner, each storage processor may have a unique frontend slice pool assigned to it by storage management process 10.

Accordingly and through the use of storage management process 10, a system that simplifies the locking, unlocking and distribution of data storage slices may be realized. Specifically, each frontend node (e.g., first frontend system 100 and second frontend system 116) may operate independently without conflicts or the need to lock data storage slices with respect to other frontend nodes (or backend nodes). Additionally and through the use of the above-described target slice level, slice level adjustment may happen asynchronously and proactively. Accordingly, storage management process 10 may maintain the appropriate level of data storage slices within the frontend slice pools, thus allowing for enhanced performance and automated scaling.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    defining a master slice pool within a backend storage array of a storage system, wherein the master slice pool includes a plurality of data storage slices;
    assigning a first portion of the plurality of data storage slices to a first frontend system included within the storage system, thus defining a first frontend slice pool;
    allocating one or more data storage slices included within the first frontend slice pool to one or more storage objects associated with the first frontend system;
    determining a quantity of unused data storage slices allocated within the first frontend slice pool; and
    adjusting allocation of the quantity of unused data storage slices within the first frontend slice pool based upon a target slice level of the quantity of unused data storage slices allocated within the first frontend slice pool.

2. The computer-implemented method of claim 1 wherein adjusting the quantity of unused data storage slices based upon a target slice level includes one or more of:
    obtaining additional data storage slices from the master slice pool for the first frontend slice pool if the quantity of unused data storage slices is less than the target slice level; and
    returning surplus data storage slices from the first frontend slice pool to the master slice pool if the quantity of unused data storage slices is greater than the target slice level.

3. The computer-implemented method of claim 1 wherein allocating one or more data storage slices included within the first frontend slice pool to one or more storage objects associated with the first frontend system includes one or more of:
    assigning a data storage slice included within the first frontend slice pool to a storage objects associated with the first frontend system; and
    unassigning a data storage slice included within the first frontend slice pool from a storage object associated with the first frontend system.

4. The computer-implemented method of claim 1 wherein the first frontend system includes a first pair of storage processors.

5. The computer-implemented method of claim 1 further comprising:
    assigning a second portion of the plurality of slices to a second frontend system included within the storage system, wherein the second frontend system includes a second pair of storage processors.

6. The computer-implemented method of claim 1 wherein the plurality of data storage slices included within the master slice pool are associated with one or more storage objects defined within the backend storage array.

7. The computer-implemented method of claim 1 wherein:

the master slice pool is compartmentalized into a plurality of performance tiers; and the first frontend slice pool is compartmentalized into a plurality of performance tiers.

8. A computer program product residing on a non-transitory computer readable medium having a plurality of instructions stored thereon which, when executed by a processor, cause the processor to perform operations comprising:

defining a master slice pool within a backend storage array of a storage system, wherein the master slice pool includes a plurality of data storage slices;

assigning a first portion of the plurality of data storage slices to a first frontend system included within the storage system, thus defining a first frontend slice pool;

allocating one or more data storage slices included within the first frontend slice pool to one or more storage objects associated with the first frontend system;

determining a quantity of unused data storage slices allocated within the first frontend slice pool; and adjusting allocation of the quantity of unused data storage slices within the first frontend slice pool based upon a target slice level of the quantity of unused data storage slices allocated within the first frontend slice pool.

9. The computer program product of claim 8 wherein adjusting the quantity of unused data storage slices based upon a target slice level includes one or more of:

obtaining additional data storage slices from the master slice pool for the first frontend slice pool if the quantity of unused data storage slices is less than the target slice level; and returning surplus data storage slices from the first frontend slice pool to the master slice pool if the quantity of unused data storage slices is greater than the target slice level.

10. The computer program product of claim 8 wherein allocating one or more data storage slices included within the first frontend slice pool to one or more storage objects associated with the first frontend system includes one or more of:

assigning a data storage slice included within the first frontend slice pool to a storage objects associated with the first frontend system; and unassigning a data storage slice included within the first frontend slice pool from a storage object associated with the first frontend system.

11. The computer program product of claim 8 wherein the first frontend system includes a first pair of storage processors.

12. The computer program product of claim 8 further comprising instructions to perform operations including:

assigning a second portion of the plurality of slices to a second frontend system included within the storage system, wherein the second frontend system includes a second pair of storage processors.

13. The computer program product of claim 8 wherein the plurality of data storage slices included within the master slice pool are associated with one or more storage objects defined within the backend storage array.

14. The computer program product of claim 8 wherein:

the master slice pool is compartmentalized into a plurality of performance tiers; and the first frontend slice pool is compartmentalized into a plurality of performance tiers.

15. A computing system including a processor and memory configured to perform operations comprising:

defining a master slice pool within a backend storage array of a storage system, wherein the master slice pool includes a plurality of data storage slices;

assigning a first portion of the plurality of data storage slices to a first frontend system included within the storage system, thus defining a first frontend slice pool;

allocating one or more data storage slices included within the first frontend slice pool to one or more storage objects associated with the first frontend system;

determining a quantity of unused data storage slices allocated within the first frontend slice pool; and adjusting allocation of the quantity of unused data storage slices within the first frontend slice pool based upon a target slice level of the quantity of unused data storage slices allocated within the first frontend slice pool.

16. The computing system of claim 15 wherein adjusting the quantity of unused data storage slices based upon a target slice level includes one or more of:

obtaining additional data storage slices from the master slice pool for the first frontend slice pool if the quantity of unused data storage slices is less than the target slice level; and returning surplus data storage slices from the first frontend slice pool to the master slice pool if the quantity of unused data storage slices is greater than the target slice level.

17. The computing system of claim 15 wherein allocating one or more data storage slices included within the first frontend slice pool to one or more storage objects associated with the first frontend system includes one or more of:

assigning a data storage slice included within the first frontend slice pool to a storage objects associated with the first frontend system; and unassigning a data storage slice included within the first frontend slice pool from a storage object associated with the first frontend system.

18. The computing system of claim 15 wherein the first frontend system includes a first pair of storage processors.

19. The computing system of claim 1 further configured to perform operations comprising:

assigning a second portion of the plurality of slices to a second frontend system included within the storage system, wherein the second frontend system includes a second pair of storage processors.

20. The computing system of claim 15 wherein the plurality of data storage slices included within the master slice pool are associated with one or more storage objects defined within the backend storage array.

* * * * *